United States Patent [19]

Kawasaki et al.

[11] Patent Number: 5,182,059

[45] Date of Patent: Jan. 26, 1993

[54] PROCESS FOR PRODUCING HIGH DENSITY SIC SINTERED BODIES

[75] Inventors: Shinji Kawasaki, Nagoya; Masaharu Kajita, Tajimi; Keiji Matsuhiro, Nagoya, all of Japan

[73] Assignee: NGK Insulators, Ltd., Japan

[21] Appl. No.: 899,159

[22] Filed: Jun. 15, 1992

Related U.S. Application Data

[63] Continuation of Ser. No. 463,129, Jan. 10, 1990, abandoned.

[51] Int. Cl.$^5$ .............................................. C04B 35/56
[52] U.S. Cl. .................................... 264/65; 264/63; 264/66; 501/90
[58] Field of Search ............... 264/65, 63, 66; 501/90

[56] References Cited

U.S. PATENT DOCUMENTS

| | | | |
|---|---|---|---|
| 4,041,117 | 8/1977 | Prochazka | |
| 4,541,975 | 9/1985 | Honma | 264/65 |
| 4,770,829 | 9/1988 | Yamoda | 264/65 |
| 4,980,104 | 12/1990 | Kawasaki | 264/65 |

FOREIGN PATENT DOCUMENTS

| | | |
|---|---|---|
| 60-255672 | 12/1985 | Japan . |
| 1533675 | 11/1978 | United Kingdom . |
| 2017070A | 9/1979 | United Kingdom . |

OTHER PUBLICATIONS

Chemical Abstracts, vol. 99, No. 12.
World Patent Index Latest Database.

*Primary Examiner*—James Derrington
*Attorney, Agent, or Firm*—Parkhurst, Wendel & Rossi

[57] ABSTRACT

A process for producing high density SiC sintered bodies by primarily firing and then hot isostatic pressing. The process includes the steps of formulating a powder consisting essentially of 90.0 to 99.8% by weight of the SiC powder, boron or a boron-containing compound in an amount of 0.1 to 5.0% by weight when calculated as boron, and carbon or a carbon-producing organic compound in an amount of 0.1 to 5.0% by weight when calculated as carbon, mixing and shaping the formulated powder, firing the shaped bodies in a temperature range from 1,900° to 2,300° C. in vacuum or in an inert gas atmosphere, and then hot isostatically pressing the fired bodies in a temperature range from 1,800° to 2,200° C. under a pressure of not less than 100 atms in an inert gas atmosphere. The SiC powder is an SiC mixed powder consisting essentially of 95.0 to 99.9% by weight of a first SiC powder composed of at least one kind of 3C and 2H polytypes and a second SiC powder composed of at least one kind of 6H, 4H and 15R polytypes and having an average grain diameter being less than twice that of the first SiC powder.

1 Claim, 1 Drawing Sheet

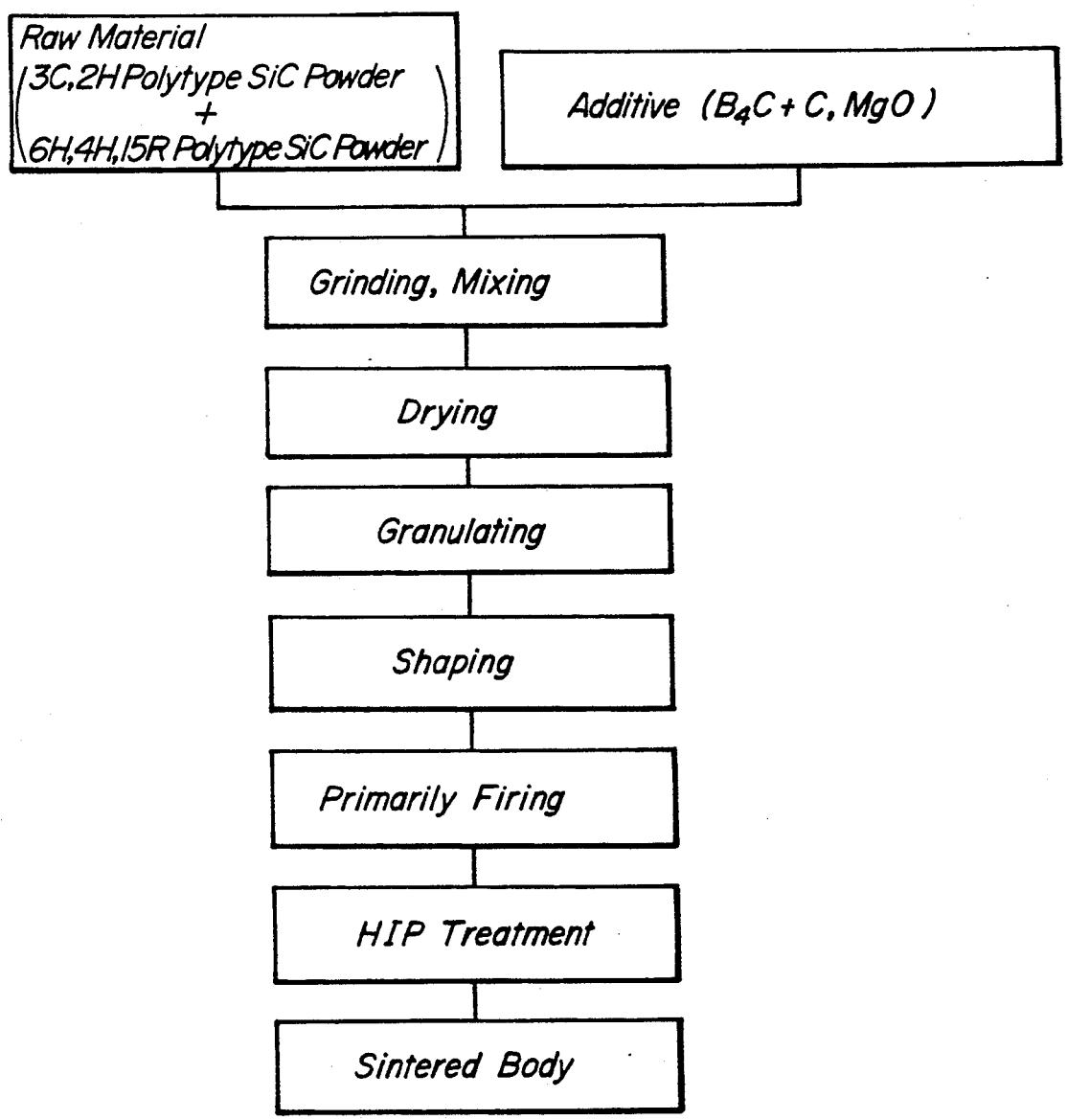

PROCESS FOR PRODUCING HIGH DENSITY SIC SINTERED BODIES

This is a Continuation of application Ser. No. 07/463,129 filed Jan. 10, 1990, now abandoned.

BACKGROUND OF THE INVENTION

1. Field of the Invention

The present invention relates to a process for producing high density SiC sintered bodies having high strength.

2. Related Art Statement

In the case of a process for producing high density SiC sintered bodies by primarily firing shaped bodies made of $\beta$-SiC added with B, C and HIP treating them, a high primary firing temperature makes SiC grains take in pores and undergo abnormal grain growth over a few hundred microns during a final firing stage. Consequently, their physical properties are deteriorated, and it becomes difficult to increase density because the pores taken inside the abnormally grown grains cannot be removed by the HIP treatment. When the primary firing temperature is lowered to avoid the abnormal grain growth, the density is not fully increased, and great densification cannot be realized even by the HIP treatment due to the presence of open pores. That is, in order to increase the density by the HIP treatment, it was necessary to strictly control the primary firing temperature range to a narrow width so that the open pore might be diminished and that remaining closed pores might be present in grain boundaries only.

From the above standpoint of view, Japanese Patent Application Laid-open No. 60-255,672 discloses a process for obtaining SiC sintered bodies having a high density of not less than 99.3% and a high strength of not less than 70 kg/mm² by strictly controlling the additive composition range of B and C in SiC added with B and C, the primary firing conditions, and the HIP treating conditions to B=0.2 to 0.5 wt %, C=0.5 to 8 wt %, 1,950 to 2,150° C., 1,850° to 1,980° C., and not less than 100 atms, respectively.

Further, Japanese Patent Application Laid-open No. 52-6,716 discloses a process for producing SiC sintered bodies having pores in grain boundaries and a composite structure composed of a planar $\alpha$-SiC and finer $\beta$-SiC granules within relatively wide ranges of the composition of additives and the firing conditions, in which the abnormal grain growth is effectively suppressed by adding 0.05 to 5% by weight of $\alpha$-SiC having a grain size as great as not less than 2 times that of $\beta$-SiC in the B-C added $\beta$-SiC.

However, since the composition range, the primary firing conditions and the HIP treating conditions are narrow in the case of the technique disclosed in Japanese Patent Application Laid-open No. 60-255,672, it is difficult to appropriately control the production conditions. Particularly when products having a great size are to be mass produced an an industrial scale, it is difficult to obtain uniform sintered bodies, and the strength is not so great, i.e., 70 kg/mm², although the density is as high as 99.3% or more.

On the other hand, various production conditions are wide in the technique disclosed in Japanese Patent Application Laid-open No. 52-6,716, which has the composite structure consisting of the planar $\alpha$-SiC grains having a greater aspect ratio, which is considered preferable from the standpoint of an increase in strength and toughness, and the finer $\beta$-SiC grains. However, since the obtained product has a density lower than that of a product using $\beta$-SiC powder alone, sintered bodies having high density, high strength, and high toughness, which have recently strongly been demanded, could not be attained. Further, since such products sintered at ordinary pressure have low density, and the pores present are of open pores, the products are unsuitable for densification by HIP treatment.

SUMMARY OF THE INVENTION

The object of the present invention is to solve the above-mentioned problems, and to provide a process for easily and stably producing high density, high strength SiC sintered bodies, in which various producing conditions have wide controllable ranges.

The process for producing high density SiC sintered bodies according to the present invention comprises the steps of forming shaped bodies composed of an SiC powder and a sintering aid, and firing and then hot isostatically pressing the shaped bodies. The process is characterized by preparing and shaping a mixture consisting essentially of 90.0 to 99.8% by weight of an SiC mixed powder consisting of 95.0 to 99.9% by weight of an SiC powder composed of at least one kind of 3C and 2H polytypes and 5.0 to 0.1% by weight of an SiC powder composed of at least one kind of 6H, 4H and 15R polytypes and having the average grain diameter of less than twice that of the 3C and 2H polytype SiC, boron or a boron-containing compound in an amount of 0.1 to 5.0% by weight when calculated as boron, and carbon or a carbon-forming organic compound in an amount of 0.1 to 5.0 wt % when calculated as carbon, firing the shaped body in a temperature range from 1,900° to 2,300° C. in vacuum or in an inert gas atmosphere, and then hot isostatically pressing the fired bodies in a temperature range from 1,800° to 2,200° C. under a in an inert gas atmosphere of not less than 100 atms pressure.

It is preferable that 0.1 to 5.0% by weight of MgO is incorporated into the formulated powder to increase the density of the SiC sintered body to be produced by the above process.

In the above-mentioned construction, the relatively high density primarily sintered body which has the composite structure consisting essentially of planar $\alpha$-SiC grains having a greater aspect ratio and a finer granular $\beta$-SiC and in which remaining closed pores are present in grain boundaries while free from open pores can be obtained by using the limited composition and grain size of the SiC powder. Thus, high strength SiC sintered bodies having the density of not less than 98% and maintaining the above composite structure by the HIP treatment can easily and stably be obtained. That is, according to the present invention, the high density SiC sintered body having the composite structure consisting essentially of planar $\alpha$-SiC grains with the greater aspect ratio, which have been considered impossible to increase the density by the HIP treatment, and the finer $\beta$-SiC grains can be obtained by the HIP treatment. The producing process according to the present invention can exhibit synergistic effects obtained by combining the use of the SiC powder having the given composition and the grain size and the HIP treatment. In the invention process, the composition range, the primary firing conditions and the HIP treating conditions to produce the above-mentioned sintered bodies can be made wider. Thus, the process according to the present invention has extremely high industrial usefulness.

Further, when MgO is added into the formulated powder, the distribution and the shape of the pores remaining in the primarily sintered body are controlled, so that the sintered body can be densified to almost an ideal density (3.21 g/cm$^3$). MgO exhibits its effect in the case that the SiC powder having the limited composition and grain size is used in the above-mentioned construction. Since MgO promotes the growth of planar α-SiC grains, which are formed with SiC nucleus as seed of at least one kind of 6H, 4H and 15R polytypes uniformly dispersed in the shaped body, uniformly grow in the primarily sintered body. As a result, the pores in the primarily sintered body to which MgO is incorporated are uniformly dispersed in the grain boundaries, so that the shape of the pores surrounded by the planar grains becomes smaller. Although MgO functions to control the microstructure of the sintered body, it evaporates during the firing. Consequently, almost no MgO remains in the primarily sintered body. The microstructure of the primarily sintered body increases the effect of densifying SiC in the HIP treatment, and the highly dense SiC sintered body having almost the an ideal density can be obtained. The above was first discovered by the present inventors.

These and other objects, features and advantages of the invention will be appreciated upo reading of the following description of the invention when taken in conjunction with the attached drawing, with the understanding that some modifications, variations and changes of the same could be made by the skilled person in the art to which the invention pertains without departing from the spirit of the invention or the scope of claims appended hereto.

BRIEF DESCRIPTION OF THE DRAWING

For a better understanding of the invention, reference is made to the attached drawing, wherein:

FIG. 1 is a flow chart illustrating an example of production steps of the producing process according to the present invention.

DETAILED DESCRIPTION OF THE INVENTION

The SiC powder composed of at least one kind of 3C and 2H polytypes is substantially a low temperature type powder synthesized at temperatures not more than 2,000° C. A silica reduction carbonization process is known as its producing process. The SiC powder composed of at least one kind of 6H, 4H and 15R polytypes is substantially a high temperature type powder synthesized at temperatures of not less than 2,000° C. An Acheson process is generally employed as its producing process. The latter SiC powder may be synthesized by treating the former SiC powder composed of at least one kind of 3C and 2H polytypes at high temperatures of no less than 2,000° C.

The reaso why the addition amount of the SiC powder composed of at least one kind of 6H, 4H and 15R polytypes to be added is limited to 5.0 to 0.1% by weight is that if it exceeds 5.0% by weight, the aspect ratio of the planar α-SiC grains becomes smaller to deteriorate the physical properties. On the other hand, if it is less than 0.1% by weight, the effects obtained by the addition disappears.

The reason why the grain diameter of the SiC powder composed of at least one kind of 6H, 4H and 15R polytypes is limited to less than twice that of the SiC powder composed of at least one kind of the 3C and 2H polytypes is that if it is more than twice, the density cannot be increased even by the HIP treatment because of a great amount of the open pores remain in the primarily sintered body.

The reason why the amount of boron as an additive is limited to 0.1 to 5.0% by weight is that if it is less than 0.1% by weight, the effect due to the addition cannot be recognized and densification is insufficient, while if it is more than 5.0% by weight, a great amount of boron remains in the grain boundaries to deteriorate high temperature characteristics. Furthermore,, the reason why the amount of carbon as an additive is limited to 0.1 to 5.0% by weight is that if it is less than 0.1% by weight, an SiO$_2$ film on the surface of the SiC cannot be removed and the densification is insufficient, while if it is more than 50% by weight, a great amount of free carbon remains in the sintered body to deteriorate the characteristics.

The reason why the amount of MgO is limited to 0.1 to 5.0% by weight is that if it is less than 0.1% by weight, the effect due to the addition cannot be recognized, and a change in the characteristics of the sintered body after the HIP treatment is not recognized as compared with a case where no MgO is added. On the other hand, if the addition amount of MgO is more than 5.0% by weight, the primarily sintered body is not sufficiently densified and pores are not closed, so that the effects cannot be exhibited by the IP treatment.

Further, the reason why the primary firing temperature before the HIP treatment is limited to 1,900° to 2,300° C. is that if it is less than 1,900° C., the open pores remain and the sintered body cannot be densified even by the HIP treatment. On the other hand, if it exceeds 2,300° C., the surface of the sintered body becomes coarse owing to decomposition of SiC. The reason why the HIP treating conditions are limited to the temperature range from 1,800° to 2,200° C. and not less than 100 atms is that if it is less than 1,800° C., the densification is insufficient, while if it is more than 2,200° C., the production process becomes too costly and meaningless. On the other hand, if the pressure is less than 100 atms, the sintered body cannot fully be densified fully. The reason why the grain diameter of the SiC powder composed of at least one kind of 6H, 4H and 15R polytypes added is preferably near that of the SiC powder composed of at least one kind of 3C and 2H polytypes, because the SiC powders can uniformly be mixed in such a case.

FIG. 1 is a flow chart illustrating an example of production steps of the producing process according to the present invention. First, a high temperature type SiC powder and a low temperature type SiC powder are prepared. Further, B$_4$C, C and MgO are prepared as additives. The high temperature type SiC powder is produced by the Acheson process, and composed of at least one kind of 6H, 4H and 15R polytypes having the average grain diameter of not more than 5 μm. The low temperature SiC powder is produced by the silica reducing carbonization process, and composed of at least one kind of 3C and 2H polytypes having the average grain diameter of not more than 5 μm. The chemical composition of each of the SiC powders is shown in Table 1 below.

TABLE 1

| Chemical composition (wt %) | 6H, 4H, 15R polytype SiC | 3C, 2H polytype SiC |
| --- | --- | --- |
| Total-Si | 69.02 | 69.24 |
| Free-SiO$_2$ | 0.80 | 0.36 |
| Free-Si | 0.02 | 0.01 |
| Free-C | 0.354 | 0.36 |
| O | 1.14 | 0.88 |
| Al | 0.009 | 0.067 |
| Fe | 0.063 | 0.040 |
| Ca | 0.021 | 0.031 |
| Mg | 0.005 | 0.016 |
| K | 0 | 0.001 |
| Na | 0.007 | 0.002 |
| Cu | 0.005 | 0.002 |
| Ti | 0.022 | 0.005 |
| N | — | 0.17 |

Next, given amounts of the thus prepared SiC powders, B$_4$C, C and MgO additives are ground and mixed in a wet type ball mill using isopropyl alcohol. After the ground and mixed material is once dried, it is granulated. The granulated powder is preliminarily shaped, and then finally shaped in a given shape by isostatic pressing. Then, after the shaped body is primarily fired in a temperature range from 1,900° to 2,300° C. in vacuum or in an inert atmosphere, an SiC sintered body is obtained by treating the fired body in a temperature range from 1,800° to 2,200° C. under pressure of not less than 100 atms in an inert atmosphere by hot isostatic pressing (HIP).

In the following, examples of the producing process according to the present invention will be explained below.

EXAMPLES

An SiC powder composed of at least one kind of 6H, 4H and 15R polytypes having the average grain diameter of 0.42 μm, an SiC powder composed of at least one kind of 3C and 2H polytypes having the average grain diameter of 0.45 μm, B$_4$C (boron carbide), C (carbon black) and MgO (magnesium oxide) were mixed at a mixing recipe shown in Table 2 in a wet type ball mill using isopropyl alcohol, and then granulated after drying. After preliminary shaping, a rectangular plate having a shape of 60×60×6 mm was prepared by isostatic pressing at 3 ton/cm$^2$. Next, the thus prepared rectangular plate was primarily fired in vacuum under conditions shown in Table 2. The primarily fired rectangular plate was treated by HIP under conditions shown in Table 2. Thereby, sintered bodies were obtained as Examples of the present invention and Comparative Examples. An SiC powder having the average grain diameter of 1.5 μm was used as the SiC powder of the 6H, 4H and 15R polytypes in Comparative Examples 5 and 6.

With, respect to the sintered bodies before and after the HIP treatment, the density was evaluated by measuring the density and the open porosity by the Archimedean process. Strength at room temperature was evaluated by effecting the four point bending test according to JIS R-1601 at room temperature (Test method for measuring the flexural strength of fine ceramics). Further, toughness was evaluated by determining K$_{IC}$ at room temperature according to the chevronnotch process, and presence or absence of abnormal grain growth was checked by observing a polished and etched surface with a microscope. Results are shown in Table 2.

TABLE 2

| | SiC material | | Sintering aid | | | Primarily firing conditions | | Primarily fired bodies | |
| --- | --- | --- | --- | --- | --- | --- | --- | --- | --- |
| | 3C, 2H type material (g) | 6H, 4H, 15R type material (g) | B$_4$C (g) | C (g) | MgO (g) | Temperature (°C.) | Time (hr) | Density (g/cm$^3$) | Open pore rate (%) |
| Comparative Example 1 | 100 | 0 | 1 | 2 | — | 2100 | 1 | 3.08 | <0.2 |
| Comparative Example 2 | 99.99 | 0.01 | 1 | 2 | — | 2100 | 1 | 3.06 | <0.2 |
| Example 1 | 99.9 | 0.1 | 1 | 2 | — | 2100 | 1 | 3.04 | <0.2 |
| Example 2 | 99.0 | 1.0 | 1 | 2 | — | 2100 | 1 | 3.02 | <0.2 |
| Example 3 | 97.0 | 3.0 | 1 | 2 | — | 2100 | 1 | 2.98 | <0.2 |
| Example 4 | 95.0 | 5.0 | 1 | 2 | — | 2100 | 1 | 3.00 | <0.2 |
| Comparative Example 3 | 90.0 | 10.0 | 1 | 2 | — | 2100 | 1 | 3.04 | <0.2 |
| Comparative Example 4 | 0 | 100 | 1 | 2 | — | 2100 | 1 | 3.10 | <0.2 |
| Comparative Example 5 | 99.0 | 1.0 | 1 | 2 | — | 2100 | 1 | 2.82 | 10.8 |
| Comparative Example 6 | 95.0 | 5.0 | 1 | 2 | — | 2100 | 1 | 2.76 | 12.1 |
| Comparative Example 7 | 99.0 | 1.0 | 0 | 2 | — | 2100 | 1 | 2.25 | 28.8 |
| Comparative Example 8 | 99.0 | 1.0 | 1 | 0 | — | 2100 | 1 | 2.48 | 21.2 |
| Comparative Example 9 | 99.0 | 1.0 | 1 | 2 | — | 1800 | 1 | 2.38 | 24.3 |

TABLE 2-continued

| | | | | | | | | | | |
|---|---|---|---|---|---|---|---|---|---|---|
| Example 5 | 99.0 | 1.0 | 1 | 2 | — | 2000 | 1 | 2.95 | 0.3 |
| Example 6 | 99.0 | 1.0 | 1 | 2 | — | 2200 | 1 | 3.05 | <0.2 |
| Comparative Example 10 | 99.0 | 1.0 | 1 | 2 | — | 2100 | 1 | 3.02 | <0.2 |
| Example 7 | 99.0 | 1.0 | 1 | 2 | — | 2100 | 1 | 3.02 | <0.2 |
| Example 8 | 99.0 | 1.0 | 1 | 2 | — | 2100 | 1 | 3.02 | <0.2 |
| Comparative Example 11 | 99.0 | 1.0 | 1 | 2 | — | 2100 | 1 | 3.02 | <0.2 |
| Example 9 | 99.0 | 1.0 | 1 | 2 | — | 2100 | 1 | 3.02 | <0.2 |
| Example 10 | 99.0 | 1.0 | 1 | 2 | 0.1 | 2100 | 1 | 3.00 | <0.2 |
| Example 11 | 99.0 | 1.0 | 1 | 2 | 2.0 | 2100 | 1 | 2.88 | <0.2 |
| Example 12 | 99.0 | 1.0 | 1 | 2 | 5.0 | 2100 | 1 | 2.82 | 0.2 |
| Example 13 | 97.0 | 3.0 | 1 | 2 | 2.0 | 2100 | 1 | 2.85 | <0.2 |
| Comparative Example 12 | 99.0 | 1.0 | 1 | 2 | 10.0 | 2100 | 1 | 2.30 | 26.2 |

| | HIP treating conditions | | | HIP treated products | | | |
|---|---|---|---|---|---|---|---|
| | Temperature (°C.) | Pressure (atm) | Time (hr) | Density (g/cm³) | Strength at room temperature (MPa) | $K_{IC}$ (MPam$^{\frac{1}{2}}$) | Presence of abnormally grown grains |
| Comparative Example 1 | 2000 | 2000 | 2 | 3.10 | 480 | 2.8 | present |
| Comparative Example 2 | 2000 | 2000 | 2 | 3.09 | 490 | 2.8 | present |
| Example 1 | 2000 | 2000 | 2 | 3.18 | 870 | 3.2 | not present |
| Example 2 | 2000 | 2000 | 2 | 3.19 | 950 | 3.5 | not present |
| Example 3 | 2000 | 2000 | 2 | 3.19 | 900 | 3.4 | not present |
| Example 4 | 2000 | 2000 | 2 | 3.19 | 850 | 3.3 | not present |
| Comparative Example 3 | 2000 | 2000 | 2 | 3.18 | 670 | 2.7 | not present |
| Comparative Example 4 | 2000 | 2000 | 2 | 3.16 | 580 | 2.6 | not present |
| Comparative Example 5 | 2000 | 2000 | 2 | 2.84 | — | — | not present |
| Comparative Example 6 | 2000 | 2000 | 2 | 2.77 | — | — | not present |
| Comparative Example 7 | 2000 | 2000 | 2 | 2.28 | — | — | not present |
| Comparative Example 8 | 2000 | 2000 | 2 | 2.54 | — | — | not present |
| Comparative Example 9 | 2000 | 2000 | 2 | 2.46 | — | — | not present |
| Example 5 | 2000 | 2000 | 2 | 3.19 | 940 | 3.5 | not present |
| Example 6 | 2000 | 2000 | 2 | 3.18 | 930 | 3.4 | not present |
| Comparative Example 10 | 1700 | 2000 | 2 | 3.02 | 570 | 2.6 | not present |
| Example 7 | 1900 | 2000 | 2 | 3.19 | 920 | 3.5 | not present |
| Example 8 | 2200 | 2000 | 2 | 3.19 | 940 | 3.5 | not present |
| Comparative Example 11 | 2000 | 50 | 2 | 3.05 | 620 | 2.7 | not present |
| Example 9 | 2000 | 500 | 2 | 3.18 | 890 | 3.3 | not present |
| Example 10 | 2000 | 2000 | 2 | 3.20 | 1050 | 3.6 | not present |
| Example 11 | 2000 | 2000 | 2 | 3.21 | 1100 | 3.7 | not present |
| Example 12 | 2000 | 2000 | 2 | 3.20 | 1030 | 3.6 | not |

TABLE 2-continued

| | | | | | | | |
|---|---|---|---|---|---|---|---|
| Example 13 | 2000 | 2000 | 2 | 3.20 | 980 | 3.5 | present |
| Comparative Example 12 | 2000 | 2000 | 2 | 2.30 | — | — | not present |

As is clear from the results in Table 2, when the amount of the SiC powder composed of 6H, 4H and/or 15R polytypes was less than 0.05% by weight (Comparative Examples 1 and 2), the abnormal grain growth of SiC occurred in the primarily fired body, so that insufficient densificatron was exhibited by the HIP treatment, and that strength and $K_{IC}$ lowered. When the amount of the SiC powder Composed of the 6H, 4H and/or 15R polytypes exceeded 5.0% by weight (Comparative Examples 3 and 4), no abnormal grain growth occurred in the primarily fired bodies. However, the aspect ratio of the α-SiC grains become smaller, and the strength and the $K_{IC}$ value lowered. When the average grain diameter of the SiC powder Composed of the 6H, 4H and/Or 15R polytypes was more than twice that of the SiC powder composed of 3C and/or 2H polytypes (Comparative Examples 5 and 6) the density of the primarily fired bodies was low, and since a great amount of open pores remain in the fired bodies, high density could not be obtained even by the HIP treatment. When the addition amount of B₄C was less than 0.1% by weight (Comparative Example 7), or when the addition amount of C was less than 0.1% by weight (Comparative Example 8), or when the primarily firing temperature was less than 1,900° C. (Comparative Example 9), the density of the primarily fired bodies is low, and since a great amount of open pores remain in the sintered bodies, the high density could not be obtained even by the HIP treatment. When the HIP treatment temperature was less than 1,800° C. (Comparative Example 10), or when the HIP treating pressure was less than 100 atms (Comparative Example 11), sufficiently high density could not be obtained even by the HIP treatment so that the strength and the $K_{IC}$ value were low. From the above, it is seen that Examples 1 through 9 satisfying the ranges of the present invention have higher density, higher strength, higher $K_{IC}$ values, and improved toughness as compared with Comparative Examples 1 through 11.

Further, when MgO is added, it is seen that the sintered bodies having undergone the HIP treatment had higher density and higher strength (Examples 10 to 13) as compared with cases where no MgO was added. However, when the addition amount of MgO is more than 5.0% by weight, the density of the primarily fired body is low, and since a great amount of open pores remain in the fired body, high density could not be obtained even by the HIP treatment (Comparative Example 12).

As is clear from the above explanation, according to the process for producing the high density SiC sintered bodies according to the present invention, high density SiC sintered bodies can easily and stably be obtained in wide ranges of the composition, the primarily firing conditions, and the HIP treating conditions by primarily firing the mixed SiC powder and then effecting the HIP treatment. In addition, the density of the SiC sintered bodies obtained according to the present invention is higher as compared with the sintered bodies composed essentially of α-SiC or β-SiC alone. Furthermore, since the sintered bodies according to the present invention have the composite structure consisting of planar α-SiC having a greater aspect ratio and the β-SiC having finer grains than those of the α-SiC, mechanical characteristics are superior to the sintered bodies composed of the α-SiC or the β-SiC alone.

What is claimed is:

1. A method of producing high density SiC sintered bodies, comprising the steps of:
   formulating a powder consisting essentially of:
   (a) 85–99.7 wt % SiC powder consisting essentially of
      (i) 95.0 to 99.9 wt % of a first SiC powder consisting of at least one of 3C and 2H polytype SiC, and
      (ii) 0.1 to 5.0 wt % of a second SiC powder consistng of at least one of 6H, 4H and 15R polytype SiC, said second SiC powder having an average grain diameter which is less than twice that of siad first SiC powder;
   (b) 0.1 to 5.0 wt %, when calculated as boron, boron or a boron-containing compound;
   (c) 0.1 to 5.0 wt %, when calculated as carbon, carbon or a carbon-producing organic compound; and
   (d) 0.1 to 5.0 wt % MgO;
   mixing the formulated powder;
   shaping the formulated powder into a shaped body;
   firing the shaped body in vacuum or an inert gas atmosphere in a temperature range from 1,900° to 2,300° C.; and
   hot isostatically pressing the fired body in an inert gas atmosphere in a temperature range from 1,800° to 2,200° C. under a pressure of not less than 100 atms.

* * * * *